Figure 3:
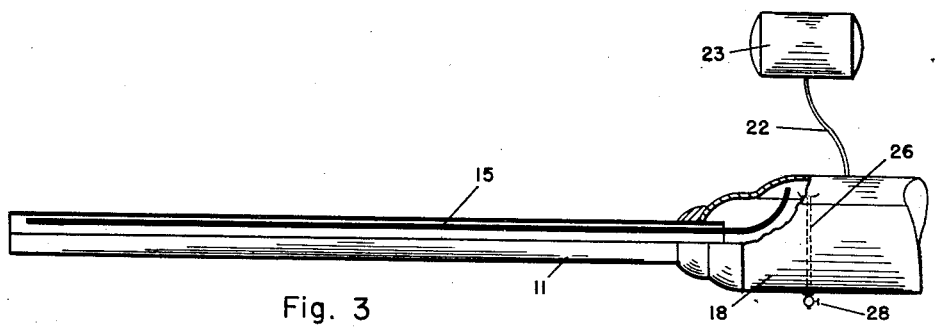

Sept. 16, 1941.  H. E. THOMPSON  2,255,832
IMPREGNATED ELECTRIC CABLE
Filed Aug. 2, 1939  3 Sheets-Sheet 1
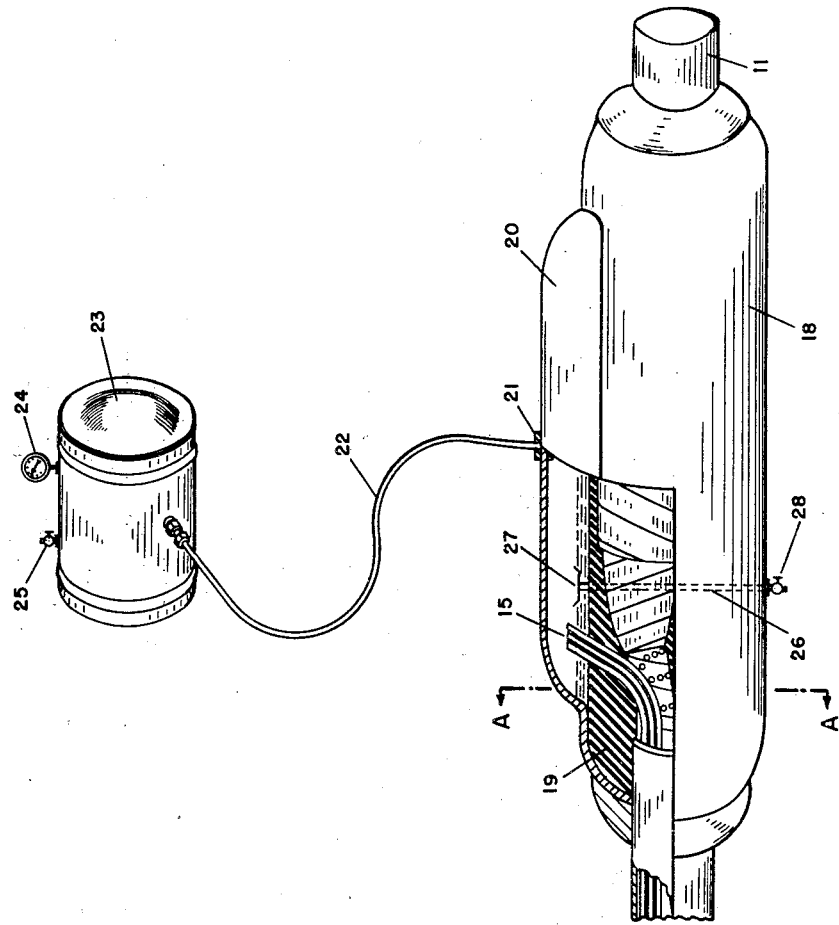
Fig. 1
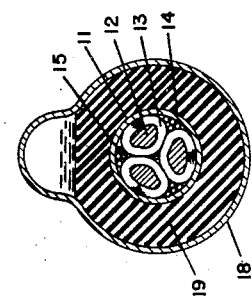
Fig. 2
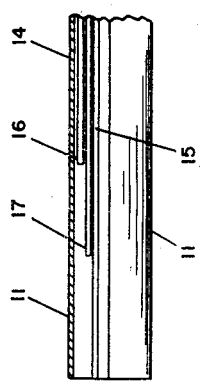
INVENTOR
HARRY E. THOMPSON
BY
ATTORNEY Sept. 16, 1941.                H. E. THOMPSON                2,255,832
                        IMPREGNATED ELECTRIC CABLE
                          Filed Aug. 2, 1939         3 Sheets-Sheet 2

INVENTOR
HARRY E. THOMPSON
BY
ATTORNEY

INVENTOR
HARRY E. THOMPSON
ATTORNEY

Patented Sept. 16, 1941

2,255,832

UNITED STATES PATENT OFFICE 2,255,832

IMPREGNATED ELECTRIC CABLE

Harry E. Thompson, Dobbs Ferry, N. Y., assignor to Anaconda Wire and Cable Company, New York, N. Y., a corporation of Delaware Application August 2, 1939, Serial No. 287,907

4 Claims. (Cl. 174—12)

This invention relates to electric cables and more particularly to electric cable designed for use at high voltages and having porous solid insulation impregnated with a fluid dielectric.

Among the several objects of the invention may be noted that provision of a simple and improved method of constructing a cable so as to relieve and equalize the pressures which arise within the outer sheath, the provision of a cable construction in which all portions of the interior of the cable are maintained at a pressure below that which is harmful to the outer sheath and the provision of a construction which will eliminate the formation of voids within the insulation. Certain features of the present invention are an outgrowth of the principles disclosed in my previously issued Patent 2,138,362.

"Solid type" paper cable as it is made today comprises a metallic conductor about which are served a large number of strips of paper which are applied until the necessary thickness of insulation has been built up. The paper-sheathed conductors are then dried and subjected to a vacuum so as to remove any air or gas which may have been absorbed and the fibrous covering is then impregnated with a suitable mineral oil under conditions of elevated temperature and pressure. After impregnation the cable is removed from the tanks in which it was treated and a lead sheath is applied, usually by extrusion.

In the solid type cable the void spaces which are found between the several insulated conductors which make up the cable are filled with jute or a similar material so that the entire cross-section will be tightly packed, and in consequence, since there are no channels provided for the ready flow of oil lengthwise of the cable, a considerable internal pressure may be built up before it is relieved by movement of the oil. In some cases the pressure may be sufficient to cause permanent damage to the sheath.

When installed, great care is taken to see that the joints between the lead sheaths are tightly sealed and that no voids remain inside the insulation. Accordingly, when the cable is energized and the temperature of the conductor rises to as much as 85 degrees centigrade, there is an attendant increase in volume of the oil as well as the balance of the insulation. Since the oil is for all practical purposes, incompressible, the result will be that the lead sheath will be expanded to provide the necessary volume. When the current is turned off and the cable cools down the oil contracts to its former volume and since the flow from one portion of the cable to another is impeded, there is a tendency to form voids within the insulation. If the current is now turned on these spots, which are frequently at sub-atmospheric pressures, ionize very readily resulting in a possibility of insulation failure. It is the chief purpose of the present invention to provide a means of absorbing the increased volume of the impregnating compound during the heating cycle and at the same time maintain a supply of excess oil available to all parts of the insulation so that when the cable cools there will be no danger of forming voids.

The invention is illustrated by concrete embodiments in the accompanying drawings in which similar reference numerals denote similar parts and in which—

Figure 4:
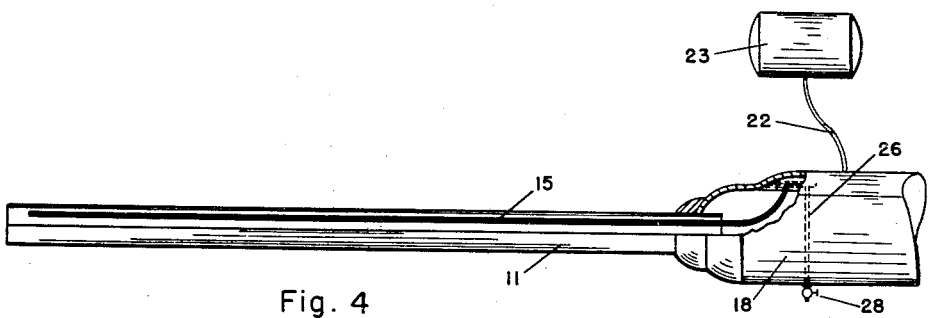
Figure 5:
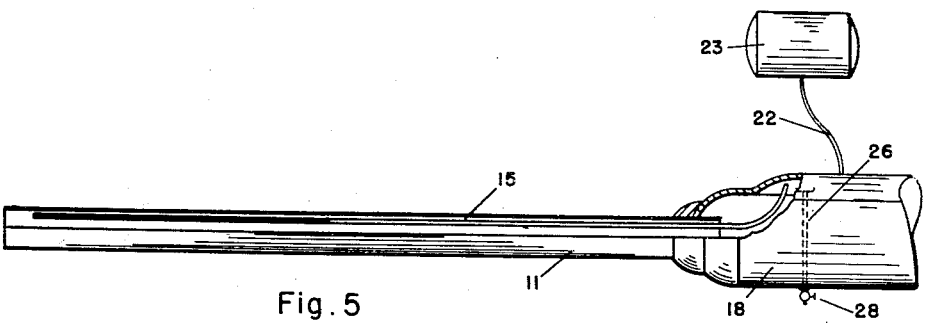
Figure 6:
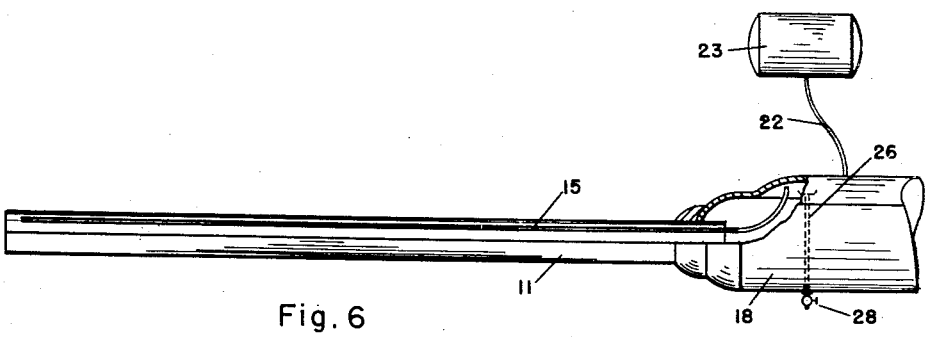
Figure 7:
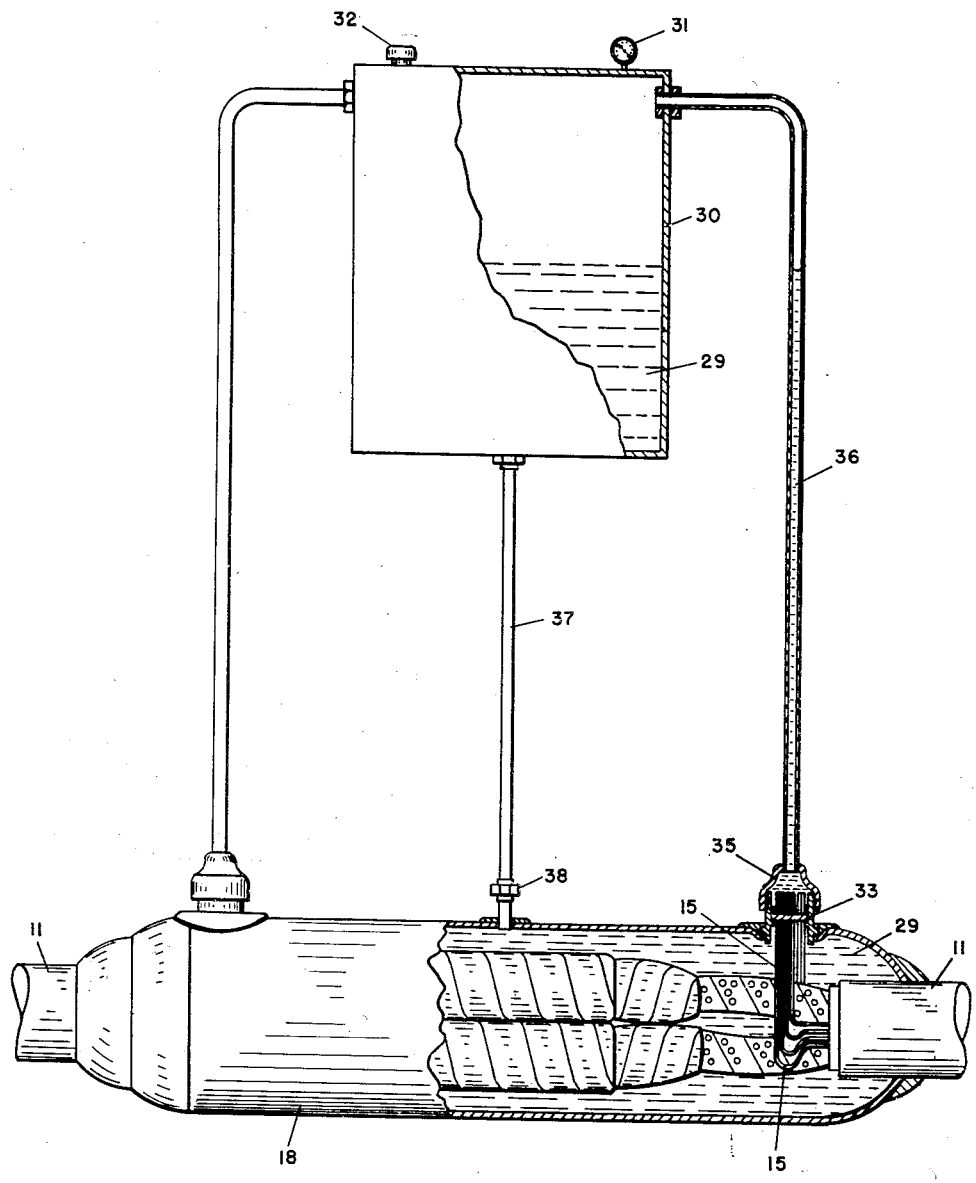

Figure 1 is a view in vertical elevation of a cable installation made in accordance with the present invention, certain parts having been broken away to reveal the construction, Figure 2 is a cross section of the cable joint shown in Figure 1 taken in the plane AA, Figure 3 is a diagrammatic cross-sectional elevation showing the first step in the operation of a cable made in accordance with the present invention, Figure 4 is a similar view showing the second step in the operation of the cable shown in Figure 3, Figure 5 is a similar view showing the third step in the operation of the cable shown in Figure 3, Figure 6 is a similar view showing the fourth step in the operation of the cable shown in Figure 3, Figure 7 is an elevation of another embodiment of the present invention, certain parts having been broken away to reveal the interior construction.

Referring to Figures 1 and 2 in the drawings a cable 11 is made up of three metallic conductors 12, (not shown in Figure 1 for the sake of simplification) which are individually insulated with wrappings of paper 13. As previously described the fibrous insulation is then impregnated with oil and the entire assembly is enclosed within a metallic sheath 14, usually of lead. In the filler spaces of the cable, which would ordinarily be filled with jute or crushed paper, is placed a group of tubes 15 of varying length, so that each one terminates within the cable at different points spaced longitudinally along its length. Each of the tubes is preferably of soft copper or similar material and is open only at its ends as shown in Figure 1, the tube 16 terminating at a point close to the end of the cable and the tube 17 being somewhat longer. So that the tubes will all be completely filled with either gas or oil at any cross-section normal to the tube, the internal diameters of the tube being of order commonly referred to as "capillary tubes."

During installation the present design of cable is handled in the same manner as those which are provided today insofar as the connection and insulation of each of the individual conductors is concerned, the metallic conductors 12 being jointed with a sleeve which is soldered or swaged in place and is then covered with hand-applied wrappings of paper or varnished cambric.

The joint is enclosed in a lead tube 18 of appropriate length whose diameter is considerably greater than that of the lead sheath surrounding the cable proper and the ends of the tube surrounding the joint are sealed to the cable sheath by means of wiped joints. The top of the joint casing is left open however for the details of installation which are peculiar to the present type of cable. The next step is to fill the joint casing 18 with a quantity of molten compound 19 sufficient to cover the wrappings of the jointed insulated conductors. Preferably the compound used should have a relatively high melting point so that it will remain solid at normal operating temperatures. Before the molten compound is poured into the joint casing the ends of the tubes 15 should be bunched together and bent up so that there will be no danger of the fluid compound 19 flowing into them and stopping them up. The opening in the upper portion of the joint casing 18 may now be sealed with a cover plate 20 which is preferably domed as shown in the drawings. Attached to the upper part of the dome is a flange 21 to which is connected a pipe 22 by means of which an inert, non-oxidizing gas maintained within the tank 23 at a pressure of approximately ten pounds per square inch may be admitted to the upper portion of the joint casing which is not filled with compound 19. The reservoir 23 is fitted with an appropriate pressure gage 24 and filling plug 25. The operation of this cable is as follows: At the time of installation, the entire cable, including the tubes 15 which are placed within the filler spaces, is completely impregnated with oil as indicated diagrammatically in Figure 3, one tube only being shown for purposes of illustration. After installation, when the cable is initially energized, the impregnated liquid expands and is forced through the tube 15 toward the joint casing 18 which at this time is under lower pressure than the interior of the cable. Since the tubes are initially filled with oil there will be a certain amount of overflow from the ends of the tubes which are sealed within the joint casing, as illustrated in Figure 4, the quantity of overflow equaling the amount of expansion of the oil. It is desirable to be able to drain off this overflow and it is for this purpose that the drainage tube 26 shown in Figure 1 is provided. The tube is prevented from sinking within the asphalt by the dished plate 27 which protects its upper end and the lower end is fitted with a valve 28 to permit draining off the excess oil. When the current is turned off in the cable the oil within the insulation contracts, lowering the pressure within the cable sheath below the pressure maintained at the joint casing and the tendency is therefore for the oil within the tubes 15 to return into the insulation. Since a certain amount of oil has overflowed and cannot find its way back into the tube, a portion of the tube will be filled with gas when the cable has reached normal room temperature, the condition illustrated in Figure 5, and the tube will therefore be partly occupied by a slug of oil 28 which moves back and forth within the tube 15, during the subsequent cycles of operation of the cable and the balance of the tube is filled with the inert gas which is supplied from the reservoir 23 and maintained under pressure. Figure 6 illustrates a typical situation when the cable is partially heated through.

When properly installed the volume of the tubes 15 included within the cable is equal to several times the increase in volume of the oil within the cable. When this is the case there will never be any possibility that the inert gas from the reservoir 23 will completely fill the tubes and thus have an opportunity to bubble into the insulation.

An alternative construction embodying the same principle is shown in Figure 7, in which the cables 11 are terminated and joined within a joint casing 18 in the same manner as the joint shown in Figure 1. In this case, however, the joint casing is completely filled with a fluid compound 29 which is preferably very similar to that used to impregnate the cable 11 and a supply of this same fluid is maintained within the lower portion of the reservoir 30, the balance of which is filled with an inert gas such as nitrogen or carbon dioxide under pressure. The tubes 15 formed within the cable are bunched together and are soldered into perforations within a metallic disc 33 so that there is no possibility of gas passing from one side of the disc 33 to the other even under a considerable differential of pressure. The bunched tubes are secured within a flanged collar 34 which is wiped to the joint casing 18. The combined tubes 15 communicate with the upper portion of the reservoir 30 by means of a cap 35 and a pipe 36 which is partly filled with oil and partly with gas as shown. The oil 29 in the reservoir 30 is supplied to the joint casing by the supply pipe 37 which is fitted at one end with a union 38 for easy assembly.

In operation this design of joint is very similar to that previously described since the overflow from the combined tubes 15 flows into the reservoir 30 when the vertical riser tube 36 is completely filled. After this the oil ebbs and flows within the tubes 15 under the influence of the pressure within the cable during heating and the gas pressure within the reservoir during cooling. The oil 29 within the reservoir which in part represents the overflow from the tubes 15 is used to maintain the joint casing in a completely filled and impregnated condition.

What I claim is:

1. A high tension cable installation comprising an insulated electric conductor surrounded by an impervious metallic sheath, a liquid impregnating medium filling the voids between said conductor and said sheath, a reservoir partially filled with an inert gas under pressure, a plurality of imperforate open-ended tubes of varying length and applied with the same lay located within said impervious outer sheath, one end of each tube being in contact with the liquid impregnating medium while the opposite ends of said tubes are grouped together, and a pipe connecting the grouped ends of said tubes with that portion of the reservoir which is filled with gas.

2. An electric cable installation comprising an insulated electric conductor surrounded by an impervious outer sheath, a liquid impregnating medium between said conductor and said sheath, a body of gas maintained under pressure greater than atmospheric and a plurality of imperforate, open-ended tubes of varying length terminating at different points spaced longitudinally within said impervious outer sheath, one end of each tube being in contact with the liquid impregnating medium while the opposite end of each tube terminates within said body of gas.

3. An electric cable installation comprising a pair of electric conductors surrounded by impervious outer sheaths, a liquid insulating medium between said conductors and said sheaths, a joint casing connecting adjacent lengths of said sheaths, said joint casing being partially filled with gas under pressure greater than atmospheric, and a plurality of open-ended tubes of varying length terminating at different points spaced longitudinally within said outer sheaths, one end of each tube being in contact with the liquid insulating medium within the sheaths while the opposite end of each tube terminates within the body of gas locating in the joint casing.

4. An electric cable installation comprising a pair of electric conductors wrapped with fibrous insulation, a fluid-impervious sheath surrounding each of said insulated conductors, a liquid saturant impregnating said fibrous insulation, a joint casing connecting adjacent ends of said sheaths, a body of inert gas maintained under super-atmospheric pressure within said joint casing, said gas being in direct contact with said liquid impregnating medium and a plurality of imperforate open-ended tubes of unequal length located within said outer sheaths, one end of each tube terminating within the body of gas in the joint casing while the opposite ends of said tubes terminate at different points spaced longitudinally within said sheaths, each of said tubes being partially filled with gas and partially filled with the liquid impregnating medium.

HARRY E. THOMPSON.